US012608232B2

(12) United States Patent
Carbon-Ogden et al.

(10) Patent No.: US 12,608,232 B2
(45) Date of Patent: Apr. 21, 2026

(54) DETERMINING AVAILABLE MEMORY ON A MOBILE PLATFORM

(71) Applicant: Google LLC, Mountain View, CA (US)

(72) Inventors: Scott James Carbon-Ogden, London (GB); James Andrew Blackler, London (GB)

(73) Assignee: Google LLC, Mountain View, CA (US)

( * ) Notice: Subject to any disclaimer, the term of this patent is extended or adjusted under 35 U.S.C. 154(b) by 865 days.

(21) Appl. No.: 17/649,120

(22) Filed: Jan. 27, 2022

(65) Prior Publication Data

US 2023/0036737 A1    Feb. 2, 2023

Related U.S. Application Data

(60) Provisional application No. 63/227,094, filed on Jul. 29, 2021.

(51) Int. Cl.
*G06F 9/50* (2006.01)
*G06N 3/04* (2023.01)

(52) U.S. Cl.
CPC .......... *G06F 9/5016* (2013.01); *G06F 9/5022* (2013.01); *G06F 9/5038* (2013.01); *G06N 3/04* (2013.01); *G06F 2209/503* (2013.01); *G06F 2209/508* (2013.01)

(58) Field of Classification Search
CPC .... G06F 9/5016; G06F 9/5022; G06F 9/5038; G06F 2209/503; G06F 2209/508; G06N 3/04
USPC ....................................................... 718/104
See application file for complete search history.

(56) References Cited

U.S. PATENT DOCUMENTS

| | | | | |
|---|---|---|---|---|
| 9,471,237 | B1* | 10/2016 | Dass ................... | G06F 11/3065 |
| 2004/0268078 | A1* | 12/2004 | Hassan ................ | G06F 9/5016 |
| | | | | 711/170 |
| 2008/0147705 | A1* | 6/2008 | Bansal ................ | G06F 12/0253 |
| 2012/0150773 | A1 | 6/2012 | DiCorpo et al. | |

(Continued)

FOREIGN PATENT DOCUMENTS

| | | |
|---|---|---|
| EP | 3514684 A1 | 7/2019 |
| WO | 2014143802 A1 | 9/2014 |
| WO | 2019213086 A1 | 11/2019 |

OTHER PUBLICATIONS

International Search Report and Written Opinion of International Application No. PCT/US2022/072375 dated Sep. 13, 2022, 13 pp.

(Continued)

*Primary Examiner* — Pierre Vital
*Assistant Examiner* — Tuan M Nguyen
(74) *Attorney, Agent, or Firm* — Shumaker & Sieffert, P.A.

(57)    ABSTRACT

An application from a plurality of applications executing at one or more processors of a computing device may determine a plurality of memory metrics of the computing device. The application may determine information indicative of a predicted safe amount of memory available for allocation by an application from the plurality of applications based at least in part on the plurality of memory metrics. The application may adjust, based at least in part on the information indicative of the predicted safe amount of memory available for allocation by the application, one or more characteristics of the application executing at the one or more processors to adjust an amount of memory allocated by the application.

18 Claims, 7 Drawing Sheets

(56) References Cited

U.S. PATENT DOCUMENTS

| | | | | |
|---|---|---|---|---|
| 2013/0067186 | A1 | 3/2013 | Pronovost et al. | |
| 2013/0332942 | A1* | 12/2013 | Ramesh | G06F 9/5016 |
| | | | | 719/318 |
| 2014/0059571 | A1 | 2/2014 | Watson et al. | |
| 2014/0302837 | A1* | 10/2014 | Ronen | H04W 24/08 |
| | | | | 455/418 |
| 2015/0067238 | A1* | 3/2015 | Marcu | G06F 12/0246 |
| | | | | 711/103 |
| 2015/0347181 | A1* | 12/2015 | Myrick | G06F 9/5016 |
| | | | | 718/102 |
| 2017/0177272 | A1* | 6/2017 | Ilangovan | G06F 3/0631 |
| 2019/0213099 | A1* | 7/2019 | Schmidt | G06N 3/044 |
| 2019/0339885 | A1* | 11/2019 | Yanagihara | G06F 3/0679 |
| 2020/0073717 | A1* | 3/2020 | Hari | G06F 9/5061 |
| 2020/0118039 | A1 | 4/2020 | Kocberber et al. | |
| 2020/0192734 | A1* | 6/2020 | Kao | G06F 11/3037 |
| 2021/0019200 | A1 | 1/2021 | Niles et al. | |

OTHER PUBLICATIONS

Li et al., "Practical Resource Usage Prediction Method for Large Memory Jobs in HPC Clusters", Asian Conference on Supercomputing Frontiers, vol. 11416, Springer International Publishing, Apr. 2019, 18 pp.

Response to Communication Pursuant to Rules 161(1) and 162 EPC dated Jan. 8, 2024, from counterpart European Application No. 22735274.7, filed Jun. 19, 2024, 15 pp.

Android Authority, "Manage Your App's Memory," retrieved from https://developer.android.com/topic/performance/memory, on Jan. 27, 2022, Last updated Jan. 11, 2022, 9 pp.

Communication pursuant to Article 94(3) EPC from counterpart European Application No. 22735274.7 dated Jan. 23, 2026, 10 pp.

* cited by examiner

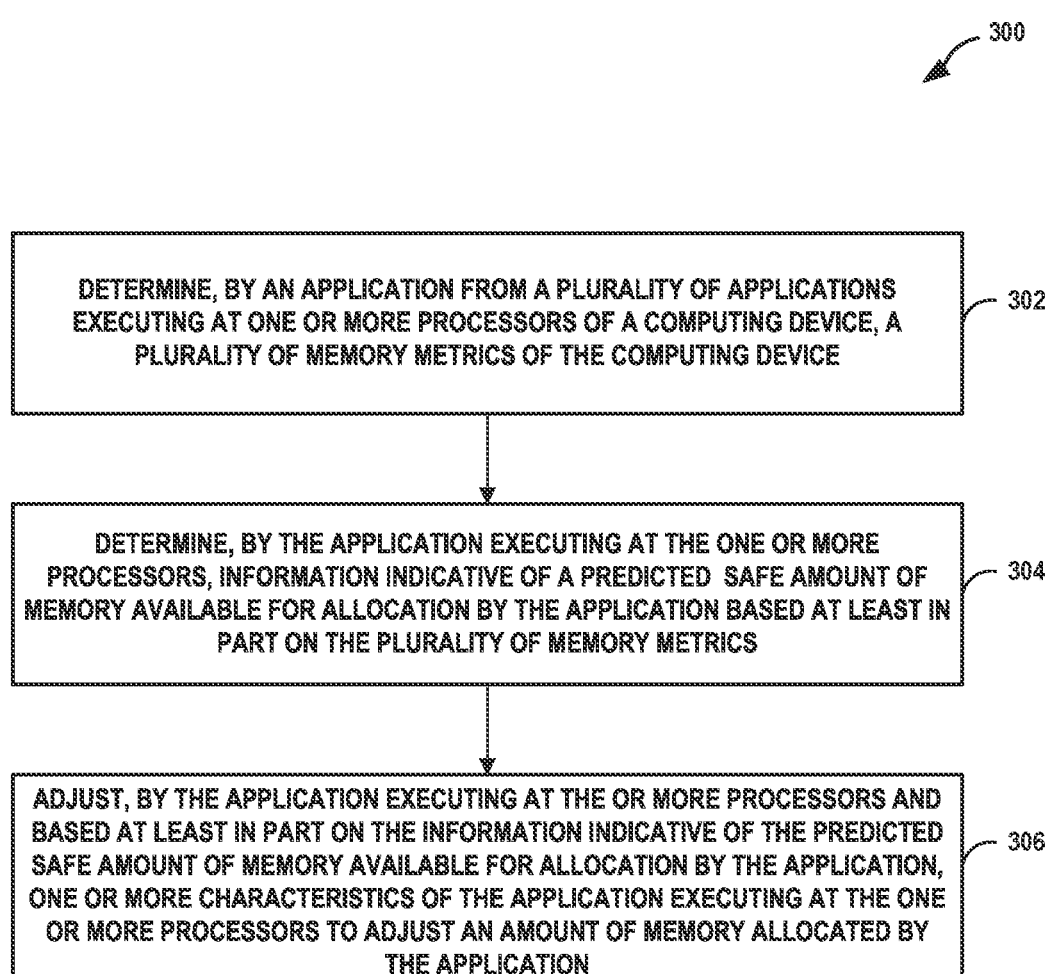

300

DETERMINE, BY AN APPLICATION FROM A PLURALITY OF APPLICATIONS EXECUTING AT ONE OR MORE PROCESSORS OF A COMPUTING DEVICE, A PLURALITY OF MEMORY METRICS OF THE COMPUTING DEVICE — 302

DETERMINE, BY THE APPLICATION EXECUTING AT THE ONE OR MORE PROCESSORS, INFORMATION INDICATIVE OF A PREDICTED  SAFE AMOUNT OF MEMORY AVAILABLE FOR ALLOCATION BY THE APPLICATION BASED AT LEAST IN PART ON THE PLURALITY OF MEMORY METRICS — 304

ADJUST, BY THE APPLICATION EXECUTING AT THE OR MORE PROCESSORS AND BASED AT LEAST IN PART ON THE INFORMATION INDICATIVE OF THE PREDICTED SAFE AMOUNT OF MEMORY AVAILABLE FOR ALLOCATION BY THE APPLICATION, ONE OR MORE CHARACTERISTICS OF THE APPLICATION EXECUTING AT THE ONE OR MORE PROCESSORS TO ADJUST AN AMOUNT OF MEMORY ALLOCATED BY THE APPLICATION — 306

FIG. 3

DETERMINING AVAILABLE MEMORY ON A MOBILE PLATFORM

RELATED APPLICATIONS

This application claims priority to U.S. Provisional Application No. 63/227,094, filed Jul. 29, 2021, the entire contents of which is hereby incorporated by reference.

BACKGROUND

Applications and processes may execute at a computing device that may have a limited amount of memory. As applications and processes execute at the computing device, the applications and processes may allocate memory to be used by the applications and processes, thereby decreasing the amount of available memory at the computing device. When the available memory at the computing device is too low, the computing device may terminate an application or process executing at the computing device to free up memory used by the terminated application or process to increase the amount of available memory at the computing device.

SUMMARY

In general, this disclosure is directed to techniques for enabling an application executing at a computing device to predict a safe amount of memory that the application can allocate without being terminated by the computing device when the computing device experiences a low memory condition. A mobile computing device may execute multiple processes (e.g., multiple applications) at the same time. As the processes execute, each of the processes may utilize the mobile computing device's memory by allocating and deallocating memory as may be needed. As the processes allocate more and more of the mobile computing device's memory, the mobile computing device may reach a low memory state where the mobile computing device runs short of available memory that is available for use (e.g., allocation) by the processes executing at the mobile computing device.

When the mobile computing device reaches such a low memory state or condition, the mobile computing device may free up available memory by throttling or terminating one or more lower priority processes, requesting processes to free noncritical cached resources, and the like. However, a process that executes at the computing device may not be able to receive or otherwise determine information regarding whether the process is in danger of being terminated by the mobile computing device due to the mobile computing device reaching a low memory state or condition. For example, the process may not be able to determine whether the process can continue to allocate additional memory without being in danger of being terminated by the mobile computing device or whether the process should free up additional memory to prevent the mobile computing device from reaching a low memory state.

In some examples, a process may access system-level memory metrics to determine whether the process can continue to allocate additional memory without being in danger of being terminated by the mobile computing device (e.g., without the mobile computing device entering the low memory state) or whether the process should free up additional memory to prevent the mobile computing device from reaching a low memory state. However, the values of system-level memory metrics may not necessarily provide an accurate indication of the real-time memory usage status of the computing device. For example, the values of some system-level memory metrics, such as memory metrics that indicate the amount of available memory in the computing device, may behave incorrectly and/or may provide incorrect values, may take too long to access and/or read, may not be affected by all types of memory allocation, and/or may lag behind the activity taking place at the computing device.

In accordance with aspects of the present disclosure, an application executing at the mobile computing device may access system-level memory metrics while the application executes and may use one or more neural networks trained via machine learning to predict, based on the memory metrics, memory usage information for the application. Such memory usage information may include information regarding a safe amount of memory that can be allocated without being in danger of being terminated by the computing device, whether the application is in danger of being terminated by the computing device, whether the application should stop significant allocations of memory, whether the application should free up memory, and the like.

The one or more neural networks may be trained using training data collected from stress tests performed across a variety of different computing devices. For example, a stress test can be performed on a computing device by an application that performs different types of allocations of memories (e.g., system memory graphics) on the computing device until the application crashes or is terminated, and the data associated with such allocation of different memories is included as training data. Such stress tests can be performed hundreds of times on each computing device across tens, hundreds, or thousands of different computing devices, and the data from those stress tests can be included in the training data. By being trained using training data collected from stress tests performed across a variety of different computing devices, the one or more neural networks may not be specific to any one type or model of computing device, but may instead be used by a variety of different types and/or models of computing devices to accurately predict memory usage information that can be used by an application to make memory usage decisions.

In some aspects, the techniques described herein relate to a method including: determining, by an application from a plurality of applications executing at one or more processors of a computing device, a plurality of memory metrics of the computing device; determining, by the application executing at the one or more processors, information indicative of a predicted safe amount of memory available for allocation by the application based at least in part on the plurality of memory metrics; and adjusting, by the application executing at the one or more processors and based at least in part on the information indicative of the predicted safe amount of memory available for allocation by the application, one or more characteristics of the application executing at the one or more processors to adjust an amount of memory allocated by the application.

In some aspects, the techniques described herein relate to a computing device, including: memory; and at least one processor communicably coupled to the memory and configured to: execute a plurality of applications; determine a plurality of memory metrics of the memory; determine information indicative of a predicted safe amount of memory available for allocation by an application from the plurality of applications based at least in part on the plurality of memory metrics; and adjust, based at least in part on the information indicative of the predicted safe amount of memory available for allocation by the application, one or more characteristics of the application executing at the one or more processors to adjust an amount of memory allocated by the application.

In some aspects, the techniques described herein relate to a computer-readable storage medium having stored thereon instructions that, when executed, cause one or more processors of a computing device to: determine a plurality of memory metrics of the memory; determine information indicative of a predicted safe amount of memory available for allocation by an application based at least in part on the plurality of memory metrics; and adjust, based at least in part on the information indicative of the predicted safe amount of memory available for allocation by the application, one or more characteristics of the application executing at the one or more processors to adjust an amount of memory allocated by the application.

In some aspects, the techniques described herein relate to a computer-readable storage medium including: means for determining a plurality of memory metrics of a computing device; means for determining information indicative of a predicted safe amount of memory available for allocation by an application based at least in part on the plurality of memory metrics; means for adjusting, based at least in part on the information indicative of the predicted safe amount of memory available for allocation by the application, one or more characteristics of the application executing at the one or more processors to adjust an amount of memory allocated by the application.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 3 is a flow diagram illustrating example operations of a mobile computing device, in accordance with one or more aspects of the present disclosure.

DETAILED DESCRIPTION

Figure 1:
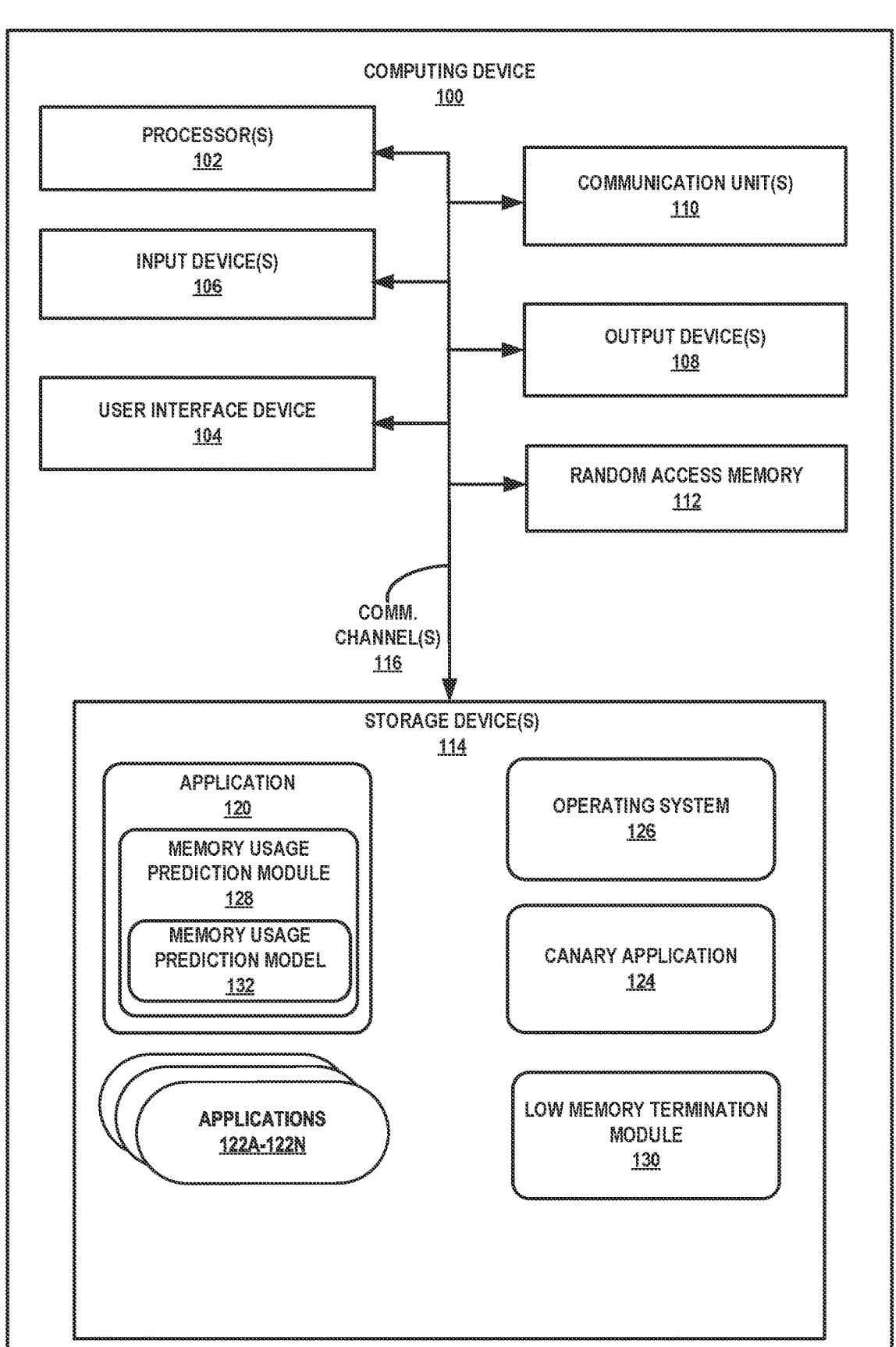
FIG. 1 is a block diagram illustrating an example mobile computing device, in accordance with one or more aspects of the present disclosure.

FIG. 1 is a block diagram illustrating an example computing device 100, in accordance with one or more aspects of the present disclosure. FIG. 1 illustrates only one particular example of computing device 100, and many other examples of computing device 100 may be used in other instances and may include a subset of the components included in example computing device 100 or may include additional components not shown in FIG. 1.

In the example of FIG. 1, computing device 100 includes one or more processors 102, user interface device 104, one or more input devices 106, one or more output devices 108, one or more communication units 110, random access memory 112, and one or more storage devices 114. Communication channels 116 may interconnect each of the components 102, 104, 106, 108, 110, 112, and/or 114 for inter-component communications (physically, communicatively, and/or operatively). In some examples, communication channels 116 may include a system bus, a network connection, an inter-process communication data structure, or any other method for communicating data between hardware and/or software.

One or more input devices 106 of computing device 100 may receive input, such as input from a user. Examples of input are touch/tactile, presence-sensitive, and audio input. Examples of one or more input devices 106 include a presence-sensitive screen, touch-sensitive screen, touchscreen, mouse, keyboard, trackpad, voice responsive system, video camera, microphone or any other type of device for detecting input from a human or machine.

One or more output devices 108 of computing device 100 may generate output. Examples of output are haptic, audio, and visual output. Examples of one or more output devices 108 include a presence-sensitive screen, a touch-sensitive screen, a touchscreen, a sound card, a video graphics adapter card, a speaker, a liquid crystal display (LCD), an organic light-emitting diode (OLED) display, a micro light-emitting diode (microLED) display, an active matrix organic light-emitting diode (AMOLED) display, a haptic device, or any other type of device for generating output to a human or machine.

One or more communication units 110 of computing device 100 may communicate with external devices via one or more networks by transmitting and/or receiving network signals on the one or more networks (e.g., one or more wired and/or wireless networks). For example, computing device 100 may use one or more communication units 110 to transmit and/or receive radio signals on a radio network such as a cellular radio network. Likewise, one or more communication units 110 may transmit and/or receive satellite signals on a satellite network such as a global positioning system (GPS) network. Examples of one or more communication units 110 include a network interface card (e.g., such as an Ethernet card), an optical transceiver, a radio frequency transceiver, a GPS receiver, or any other type of device that can send and/or receive information. Other examples of communication units 110 may include short wave radios, cellular data radios, wireless Ethernet network radios, as well as universal serial bus (USB) controllers.

User interface device 104 may be a display device at which information is displayed. In some examples, user interface device 104 may provide output to a user using haptic, audio, or visual stimuli as described above with reference to one or more output devices 108. For example, user interface device 104 may provide display or video output as described with reference to one or more output devices 108.

User interface device 104 may also provide input capabilities such as that described above with reference to one or more input devices 106. For example, user interface device 104 may be a presence-sensitive screen that may receive tactile user input from a user of computing device 100. When user interface device 104 is a presence-sensitive screen, user interface device 104 may include a presence-sensitive input component that may detect an object at and/or near the screen of user interface device 104. As one example range, user interface device 104 may detect an object, such as a finger or stylus that is within two inches or less of the scree of user interface device 104. User interface device 104 may determine a location (e.g., an (x, y) coordinate) of user interface device 104 at which the object was detected. In another example range, user interface device 104 may detect an object six inches or less from user interface device 104, and other ranges are also possible. User interface device 104 may determine the location of user interface device 104 selected by a user's finger using capacitive, inductive, radar-based, and/or optical recognition techniques. In some examples, user interface device 104 also provides output to a user using touch, presence-sensitive, audio, or video stimuli as described with respect to user interface device 104. User interface device 104 may be any type of output device that provides visual output, such as described with respect to one or more output devices 108.

While illustrated as an internal component of computing device 100, user interface device 104 may also represent an external component that shares a data path with computing device 100 for transmitting and/or receiving input and output. For instance, in one example, user interface device 104 represents a built-in component of computing device 100 located within and physically connected to the external packaging of computing device 100 (e.g., a screen on a mobile phone). In another example, user interface device 104 represents an external component of computing device 100 located outside and physically separated from the packaging of computing device 100 (e.g., a monitor and/or a projector that shares a wired and/or wireless data path with a tablet computer).

User interface device 104 of computing device 100 may detect two-dimensional and/or three-dimensional gestures as input from a user of computing device 100. For instance, a sensor of user interface device 104 may detect a user's movement (e.g., moving a hand, an arm, a pen, a stylus) within a threshold distance of the sensor of user interface device 104. User interface device 104 may determine a two- or three-dimensional vector representation of the movement and correlate the vector representation to a gesture input (e.g., a hand-wave, a pinch, a clap, a pen stroke) that has multiple dimensions. In other words, user interface device 104 can detect a multi-dimensional gesture without requiring the user to gesture at or near a screen or surface at which user interface device 104 outputs information for display. Instead, user interface device 104 can detect a multi-dimensional gesture performed at or near a sensor which may or may not be located near the screen or surface at which user interface device 104 outputs information for display.

Random access memory (RAM) 112 within computing device 100 may store information for processing during operation of computing device 100 (e.g., during execution of one or more of application 120, applications 122A-122N, canary application 124, operating system 126, memory usage prediction module 128, low memory termination module 130, and memory usage prediction model 132). In some examples, RAM 112 include temporary memory, meaning that a primary purpose of RAM 112 is not long-term storage. RAM 112 on computing device 100 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage devices 114, in some examples, include one or more computer-readable storage media. Storage devices 114 may be configured to store larger amounts of information than volatile memory. Storage devices 114 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EE-PROM) memories. In the example of FIG. 1, storage devices 114 may store program instructions and/or data associated with application 120, applications 122A-122N, canary application 124, operating system 126, memory usage prediction module 128, low memory termination module 130, and memory usage prediction model 132.

In certain examples, storage devices 114, or one or more of components included in storage devices 114, may be stored on one or more remote computing devices that are external to computing device 100 (e.g., on one or more external servers). In some examples, one or more remote computing devices may store and/or execute application 120, applications 122A-122N, canary application 124, operating system 126, memory usage prediction module 128, low memory termination module 130, and/or memory usage prediction model 132. In these examples, the one or more remote computing devices may perform functionality similar to that described herein in reference to processors 102.

One or more processors 102 may implement functionality and/or execute instructions within computing device 100. One or more processors 102 may receive and execute instructions stored by storage devices 114 that execute the functionality of application 120, applications 122A-122N, canary application 124, operating system 126, memory usage prediction module 128, low memory termination module 130, and memory usage prediction model 132. These instructions executed by processors 102 may cause computing device 100 to store information within storage devices 114 and/or RAM 112 during program execution. Processors 102 may execute instructions of application 120, applications 122A-122N, canary application 124, operating system 126, memory usage prediction module 128, low memory termination module 130, and memory usage prediction model 132 to perform one or more operations. That is, application 120, applications 122A-122N, canary application 124, operating system 126, memory usage prediction module 128, low memory termination module 130, and memory usage prediction model 132 may be operable by processors 102 to perform various functions described herein.

In some alternate examples, computing device 100 may only comprise or otherwise include processors 102 and memory 112. In these examples, one or more input devices 106, user interface device 104, one or more communication units 110, one or more output devices 108, and storage devices 114 may be external to, yet communicatively coupled with (e.g., via communication channels 116), computing device 100.

Operating system 126 may execute at one or more processors 102 to cause computing device 100 to perform various functions to manage hardware resources of computing device 100 and to provide various common services for other computer programs.

Low memory termination module 130 may execute at one or more processors 102 to monitor the usage of RAM 112 by processes, such as applications 120, executing at one or more processors 102. For example, low memory termination module 130 may be an operating system-level daemon of operating system 126. In some examples, low memory termination module 130 may execute to determine whether the usage of RAM 112 (e.g., the amount of memory that is allocated) exceeds a low memory termination threshold. If low memory termination module 130 determines that the usage of RAM 112 exceeds a low memory termination threshold, computing device 100 may enter a low memory state. In some examples, low memory termination module 130 may execute to determine whether the amount of free memory in RAM 112 is less than a free memory termination threshold. If low memory termination module 130 determines that the amount of free memory (e.g., unallocated memory) in RAM 112 is below a free memory termination threshold, computing device 100 may enter a low memory state. Low memory termination module 130 may, when computing device 100 enters the low memory state, terminate (i.e., kill) one or more of the processes executing at one or more processors 102, such as by terminating one or more of applications 120.

In some examples, low memory termination module 130 may, in response to the usage of RAM 112 exceeding the low memory termination threshold and/or the amount of free memory in RAM 112 being below the free memory termination threshold (and thus cause computing device 100 to enter the low memory state), determine a process to terminate out of the processes currently executing at one or more processors 102, such as based on the priority levels associated with the processes executing at one or more processors 102. For example, when low memory termination module 130 determines that the usage of RAM 112 exceeds the low memory termination threshold, low memory termination module 130 may terminate the process associated with the lowest priority level out of the processes executing at one or more processors 102.

In some examples, each process that executes at one or more processors 102 is associated with an out-of-memory score called an oom_adj score, where the out-of-memory score associated with a process may indicate the priority level associated with the process, and where a higher oom_adj score may indicate a lower priority. When low memory termination module 130 determines that computing device 100 has entered the low memory state, low memory termination module 130 may terminate the process associated with the highest out-of-memory score out of the processes executing at one or more processors 102.

Application 120 and applications 122A-122N ("applications 122") may include one or more different various applications. Examples of application 120 and applications 122 include an e-mail application, a camera application, a map or navigation application, a calendar application, a messaging application, a social media application, a travel application, a game application, a stock application, a weather application, and the like.

Application 120 and applications 122 may execute at one or more processors 102. As application 120 and applications 122 execute at one or more processors 102, application 120 may determine one or more memory metrics of the computing device and may determine, based on the memory metrics of the computing device, information indicative of a safe amount of memory available for allocation by the application 120 based at least in part on the one or more memory metrics. Application 120 may adjust, based on the information indicative of a safe amount of memory available for allocation by the application 120, one or more characteristics of application 120 executing at one or more processors 102.

In the example of FIG. 1, application 120 includes memory usage prediction module 128. In some examples, memory usage prediction module 128 may be a library that is included in the application package of application 120 or is otherwise bundled in application 120 rather than being included in operating system 126. That is, in examples where computing device 100 downloads application 120 from an external system, the application package of application 120 downloaded by computing device 100 may bundle or otherwise include a copy of memory usage prediction module 128. Memory usage prediction module 128 may execute to predict, based on the memory usage of application 120 as well as other applications (e.g., applications 122) and/or processes that execute at one or more processors 102, the amount of memory of RAM 112 that is safe for application 120 to allocate without causing computing device 100 to enter a low memory state and therefore be in danger of being terminated by low memory termination module 130. In addition, memory usage prediction module 128 may also execute to predict, based on the memory usage of application 120 as well as other applications (e.g., applications 122) and/or processes that execute at one or more processors 102, whether application 120 is in danger of being terminated by low memory termination module 130 due to computing device 100 being in the low memory state. For the purposes of this disclosure, memory of RAM 112 may mean native heap memory, such as allocated by malloc, and graphics memory that can be allocated by application 120.

When application 120 executes at one or more processors 102, memory usage prediction module 128 may execute as a separate process at one or more processors 102 to determine the one or more memory metrics of computing device 100. Memory usage prediction module 128 may execute at one or more processors 102 to determine the one or more memory metrics in real-time as application 120 executes at one or more processors 102. As the memory metrics of computing device 100 changes during execution of application 120, memory usage prediction module 128 may be able to determine the latest memory metrics of computing device 100.

The memory metrics of the computing device 100 may include information associated with usage of RAM 112 by processes executing at one or more processors 102 of computing device 100, such as the usage of RAM 112 by application 120, applications 122, operating system 126, an any other processes executing at one or more processors 102. In some examples, the memory metrics of computing device 100 may include one or more memory metrics that are indicative of how much more memory of RAM 112 can be allocated before low memory termination module 130 terminates a process executing at one or more processors 102, one or more memory metrics that are indicative of how much memory of RAM 112 is allocated to processes executing at one or more processors 102, one or more metrics that are indicative of a total amount of the memory of RAM 112 that can be allocated before low memory termination module 130 terminates a process executing at one or more processors 102, and/or one or more metrics that indicative of RAM 112 experiencing memory pressure.

Computing device 100 may track memory metrics at an operating system level or at a kernel level by computing device 100. As such, the memory metrics of computing device 100 may include one or more kernel-level memory metrics and/or one or more operating system-level memory metrics, and memory usage prediction module 128 may use, as input, any combination of kernel-level memory metrics and system-level memory metrics, to make the one or more predictions described above. The one or more kernel-level memory metrics may include information derived by the kernel of operating system 126 and stored in the internal data structures of the kernel. In the example where the kernel is a Linux kernel, the values of the internal data structures are exposed by one or more files of a proc file system that acts as an interface to the internal data structures in the kernel. The kernel may continuously write the latest values of the kernel's internal data structures to the one or more files of the proc file system, and memory usage prediction module 128 may access (e.g., read) the one or more files of the proc file system on one or more storage devices 114 to determine the latest values of one or more kernel-level memory metrics.

In some examples, the kernel-level memory metrics may include information about the distribution and utilization of memory of RAM 112 by applications and processes executing at one or more processors 102. In the example of a Linux kernel, the directory /proc/meminfo includes the following kernel-level memory metrics:

Active
Active(anon)
Active(file)
AnonPages
Bounce
Buffers
Cached
CmaTotal
CommitLimit
Committed_AS
Dirty
Inactive
Inactive(anon)
Inactive(file)
Kernel Stack
Mapped
MemAvailable
MemFree
MemTotal
Mlocked
NFS_Unstable
PageTables
SReclaimable
SUnreclaim
Shmem
Slab
SwapCached
SwapFree
SwapTotal
Unevictable
VmallocChunk
VmallocTotal
VmallocUsed
Writeback
WritebackTmp In some examples, the kernel-level memory metrics may include per-process memory metrics. In the example of a Linux kernel, the directory /proc contains a sub-directory for each process executing at one or more processors 102. For example, a directory /proc/<pid> may be a sub-directory for process <pid> executing at one or more processors 102. The kernel-level memory metrics may include, for a process, a value indicative of a priority level of the process, such as an out-of-memory score associated with the process. In the example of a Linux kernel, the file /proc/<pid>/oom_score includes, for process <pid> an associated out-of-memory score for the process <pid> that is indicative of the priority level of the process, where a process associated with a lower out-of-memory score may be of a higher priority level than a process associated with a higher out-of-memory score.

In some examples, the kernel-level memory metrics may include per-process memory metrics that include status information for a process. In the example of a Linux kernel, the file /proc/<pid>/status includes the following status information for a process <pid>:

VmData
VmExe
VmHWM

VmLck
VmLib
VmPMD
VmPTE
VmPeak
VmPin
VmRSS
VmSize
VmStk
VmSwap

The one or more operating system-level memory metrics may be information returned from operating system 126 by calling one or more functions of operating system 126's application programming interface (API). Memory usage prediction module 128 may call such functions of operating system 126's API to receive the latest values of one or more system-level memory metrics.

In some examples, memory usage prediction module 128 may call a function provided by operating system 126 to receive information regarding available memory. In the example of an Android operating system, memory usage prediction module 128 may call the ActivityMonitor.MemoryInfo function. The function may return values for the following parameters:

availMem—the available memory on the system;
lowMemory—set to true when the system considers itself to be in a low memory situation;
threshold—the threshold of availMem at which the system considers memory to be low and start terminating background services and other non-extraneous processes; and
totalMem—the total memory accessible by the kernel.

In some examples, memory usage prediction module 128 may call functions provided by operating system 126 to receive information regarding memory usage of one or more processes executing at one or more processors 102. In the example of an Android operating system, memory usage prediction module 128 may call the ActivityMonitor.getProcessMemoryInfo function and pass the process identifier of application 120 to the function to receive information regarding memory usage by application 120. The function may return values for the parameter MemoryInfo, which may be information regarding the memory usage of application 120.

In some examples, memory usage prediction module 128 may also call one or more debugging functions provided by operating system 126 to receive information regarding memory usage of one or more processes executing at one or more processors 102. In the example of an Android operating system, memory usage prediction module 128 may call the Debug.getNativeHeapAllocatedSize function to receive an indication of the amount of allocated memory in the native heap for application 120.

Memory usage prediction module 128 may perform the techniques described herein to retrieve, access, or otherwise determine a plurality of memory metrics, including one or more kernel-level metrics and/or one or more operating system-level metrics, in real-time as application 120 executes at one or more processors 102 and uses memory in RAM 112. In some examples, memory usage prediction module 128 may perform polling for the one or more memory metrics to retrieve, access, or otherwise determine the values of the one or more memory metrics. In some examples, memory usage prediction module 128 may spawn a background process that periodically, such as based on a timer, retrieves, accesses, or otherwise determines the values of the one or more memory metrics and pushes the values of the one or more memory metrics to memory usage prediction module 128.

Application 120, may, while executing at one or more processors 102, use memory usage prediction module 128 to determine information indicative of a predicted safe amount of memory in RAM 112 that is available for allocation by application 120. When application 120 is launched, memory usage prediction module 128 associated with application 120 may also launch and execute as a separate process at one or more processors 102 to determine, based on a plurality of the memory metrics, information indicative of memory available for allocation by application 120. In some examples, determining memory information indicative of a predicted safe amount of memory for allocation by application 120 may include predicting, based on a plurality of the memory metrics, a safe amount of memory available for allocation by application 120. As memory usage prediction module 128 executes at one or more processors 102, memory usage prediction module 128 may retrieve and/or determine, in real time, the values of a plurality of memory metrics and to predict, based on a plurality of the memory metrics, a safe amount of memory available for allocation by application 120.

As described above, when low memory termination module 130 determines the usage (e.g., the amount of memory allocated by processes executing at one or more processors 102) of RAM 112 exceeds a low memory termination threshold, low memory termination module 130 may enter a low memory state and may terminate one or more processes executing at one or more processors 102. For example, low memory termination module 130 may terminate the process associated with the lowest priority level out of the one or more processes executing at one or more processors 102. Thus, in some examples, application 120 may be in danger of being terminated by low memory termination module 130 when the amount of memory of RAM 112 allocated by processes executing at one or more processors 102 exceeds the low memory termination threshold.

As such, the safe amount of memory for allocation by application 120 may be the total amount of memory of RAM 112 that application 120 can allocate during execution of application 120 without causing computing device 100 to enter a low memory state. In some examples, the safe amount of memory for allocation by application 120 may be the amount of additional memory in RAM 112 that is safe for allocation by application 120 without causing computing device 100 to enter a low memory state. That is, given that application 120 may have already allocated a certain amount of memory in RAM 112 prior to memory usage prediction model 128 predicting the safe amount of memory for allocation by application 120, the resulting output by memory usage prediction module 128 may therefore indicate the amount of memory additional to what application 120 has already allocated that is safe for allocation by application 120. The amount of additional memory in RAM 112 that is safe for allocation by application 120 may be referred to herein as headroom.

Memory usage prediction module 128 may predict, based on a plurality of the memory metrics, which may be a subset (i.e., fewer than all) of the memory metrics listed above, a safe amount of memory available for allocation by application 120, rather than relying on the values of individual memory metrics because such individual memory metrics may not necessarily correlate with actual memory use and availability of RAM 112 and may not reflect an accurate real-time memory usage of RAM 112. For example, individual memory metrics may sometimes have unexpected behavior on certain systems, may take too long to read, may not be affected by all types of memory allocation, may lag behind real-time memory activity, and/or may otherwise be unable to accurately reflect the actual memory usage of RAM 112.

In the example of the availMem memory metric, a significant portion of the available memory of the system indicated by the availMem memory metric as being available may actually be needed for computing device 100 to operate in an optimal fashion and is therefore not actually available for allocation by application 120. In another example, while the MemAvailable memory metric in the directory /proc/meminfo may indicate an estimated amount of memory available for starting new applications, such a memory metric may not be present on certain computing devices and may not properly increase the estimated amount of memory available for starting new applications when memory is freed.

In some examples, determining information indicative of a predicted safe amount of memory for allocation by application 120 may include predicting, based on the plurality of memory metrics, whether application 120 is in danger of being terminated by low memory termination module 130. Application 120 may be in danger of being terminated by low memory termination module 130 when computing device 100 is in a low memory state. As such, predicting, based on the plurality of memory metrics, whether application 120 is in danger of being terminated by low memory termination module 130 may include predicting, based on the plurality of memory metrics, whether computing device 100 is in a low memory state. If memory usage prediction module 128 predicts, based on the plurality of memory metrics, that computing device 100 is in a low memory state, memory usage prediction module 128 may determine that application 120 is in danger of being terminated by low memory termination module 130.

Memory usage prediction module 128 may use any suitable technique to predict, based on a plurality of the memory metrics, a safe amount of memory available for allocation by application 120 and to predict, based on the plurality of memory metrics, whether application 120 is in danger of being terminated by low memory termination module 130. In some examples, the memory metrics used to predict the safe amount of memory available for allocation by application 120 and to predict whether application 120 is in danger of being terminated by low memory termination module 130 may include any combination of the following memory metrics:

parameters from the /proc/meminfo file, including the parameters Active, Active(anon), Active(file), Anon-Pages, MemAvailable, MemFree, VmData, VmRSS, CommitLimit, HighTotal, LowTotal, and MemTotal;

parameters from the /proc/<pid>/status file for the applications and processes executing at the computing devices and/or for the application or process terminated due to a low memory or out of memory condition, including the parameters VmRSS and VmSize, where VmRSS may indicate, for a process, the size of the memory portions used by the process, and where VmSize may indicate the total program size of the process;

parameters returned from calling the function Activity-Manager.getMemoryInfo( ), including the parameters totalMem, threshold, availMem and lowMemory;

the out-of-memory scores from the /proc/<pid>/oom_score file for the applications and processes executing at the computing devices and/or for the application or process terminated due to a low memory or out of memory condition;

parameters returned from calling the function Debug.get-NativeHeapAllocatedSize( ); and parameters returned from calling the function Activity-Manager.getProcessMemoryInfo( ).

In some examples, memory usage prediction module 128 may predict whether application 120 is in danger of being terminated by low memory termination module 130 by monitoring canary application 124 that is executing at one or more processors 102 to determine whether canary application 124 has been terminated by low memory termination module 130. Memory usage prediction module 128 may, in response to determining that canary application 124 has been terminated by low memory termination module 130, make a prediction that application 120 is in danger of being terminated by low memory termination module 130, and may, based on making the prediction that application 120 is in danger of being terminated by low memory termination module 130, send a warning to application 120 that indicates application 120 is in danger of being terminated by low memory termination module 130.

In some examples, memory usage prediction module 128 may predict a safe amount of memory available for allocation by application 120 and may predict whether application 120 is in danger of being terminated by low memory termination module 130 by monitoring the values of a plurality of memory metrics. In some examples, the plurality of memory metrics may include any combination of the memory metrics listed above. In some examples, the plurality of memory metrics may be memory metrics that indicate how much memory of RAM 112 is being used. Examples of such memory metrics may include the VmRSS parameter from the file /proc/<pid>/status that indicates the amount of physical memory used by the process <pid>, the VmSize parameter from the file /proc/<pid>/status that indicates the total program size of the process <pid>, the summary.total-pss parameter from calling the Debug.MemoryInfo.getMemoryStat( ) function that indicates the proportional set size memory usage, the mapped from /proc/meminfo, parameters returned from calling the function Debug.getNativeHeapAllocatedSize( ) that indicate the size of the allocated native heap the PSS parameter from Debug class that indicates the amount of proportional set size memory used by a process, and the like.

Memory usage prediction module 128 may monitor the values of the plurality of memory metrics as applications and processes executing at processors 102 are terminated, such as by low memory termination module 130 to therefore determine the highest value reached by each of the plurality of memory metrics, at a point in time immediately prior to the termination of an application or process. Such highest value reached by each of the plurality of metrics may serve as a respective upper threshold for each of the plurality of memory metrics.

In some examples, memory usage prediction module 128 may use upper thresholds for each of a plurality of memory metrics that may be pre-loaded on computing device 100, such as during manufacture, may be received from an external system (e.g., the cloud), may be downloaded during software updates, and the like. In some examples, an external system may periodically determine upper thresholds for each of a plurality of memory metrics that is specific to the particular model and configuration of computing device 100, and computing device 100 may periodically receive, from the external system, updated upper thresholds for each of a plurality of memory metrics that is specific to the particular model and configuration of computing device 100.

In some examples, memory usage prediction module 128 may use machine learning to predict upper thresholds for each of a plurality of memory metrics. For example, memory usage prediction module 128 may include memory usage prediction model 132 that includes one or more neural networks trained to determine, based on the highest value reached by each of the plurality of memory metrics, at points in time immediately prior to the termination of one or more applications or processes inputted into memory usage prediction module 128, produce outputs that are upper thresholds for each of a plurality of memory metrics.

In general, one or more neural networks implemented by memory usage prediction model 132 may include multiple interconnected nodes, and each node may apply one or more functions to a set of input values that correspond to one or more features, and provide one or more corresponding output values that are upper thresholds for each of a plurality of memory metrics. In some examples, the one or more neural networks of memory usage prediction model 132 may be trained off-device and then downloaded to or installed at computing device 100. In some examples, the one or more neural networks of memory usage prediction model 132 may be trained on-device by memory usage prediction model 132 to more accurately determine upper thresholds for each of a plurality of memory metrics. For instance, one or more neural networks may include one or more learnable parameters or "weights" that are applied to the features. Memory usage prediction model 132 may adjust these learnable parameters during the training to improve the accuracy with which one or more neural networks determines upper thresholds for each of a plurality of memory metrics.

Memory usage prediction module 128 may determine whether application 120 is in danger of being terminated by low memory termination module 130 by determining whether any one of the plurality of memory metrics has a current value that exceeds the upper threshold for the memory metric. In some examples, if memory usage prediction module 128 determines that the current value of at least one of the plurality of metrics exceeds the upper threshold for the metric, memory usage prediction module 128 may predict that application 120 is in danger of being terminated by low memory termination module 130, and may send a warning to application 120 that indicates application 120 is in danger of being terminated by low memory termination module 130. In some examples, if memory usage prediction module 128 determines that the current value of each of the plurality of metrics exceeds a respective upper threshold for the metric, memory usage prediction module 128 may predict that application 120 is in danger of being terminated by low memory termination module 130, and may send a warning to application 120 that indicates application 120 is in danger of being terminated by low memory termination module 130.

In some examples, memory usage prediction module 128 may predict the safe amount of memory available for allocation by application 120 as the difference between one or more of the current values a plurality of memory metrics and one or more of the upper threshold for the respective plurality of memory. For example, memory usage prediction module 128 may predict the safe amount of memory available for allocation by application 120 as the difference between the current value of the availMem memory metric and the determined upper threshold of the availMem memory metric. In another example, memory usage prediction module 128 may determine the difference between the current values of each of a plurality of memory metrics that indicate how much memory of RAM 112 is being used and the respective upper threshold of each of the plurality of memory metrics, and may predict the safe amount of memory available for allocation by application 120 as the smallest of the differences between the current values of each of the plurality of memory metrics and the respective upper threshold of each of the plurality of memory metric.

In some examples, memory usage prediction module 128 may, based on predicting a safe amount of memory for allocation by application 120 and/or whether application 120 is in danger of being terminated, determine whether significant allocation of memory by application 120 should stop and/or determine whether memory allocated by application 120 should be freed. Examples of a significant allocation of memory may be memory allocations over a specified amount of memory, such as allocations of over 100 megabytes of memory, allocations of over 50 megabytes of memory, and the like.

In some examples, if memory usage prediction module 128 determines that the predicted safe amount of memory for allocation by application 120 is below a specified threshold, such as 100 megabytes of memory, 50 megabytes of memory, and the like, or if the predicted safe amount of memory for allocation by application 120 as a percentage of the memory size of RAM 112 is below a specified threshold (e.g., 3%, 5%, 7%, etc.), memory usage prediction module 128 may determine that significant allocation of memory by application 120 should stop. In some examples, if memory usage prediction module 128 predicts that application 120 is in danger of being terminated, memory usage prediction module 128 may determine that memory allocated by application 120 should be freed.

In some examples, memory usage prediction module 128 may also use machine learning to predict a safe amount of memory available for allocation by application 120 without causing computing device 100 to enter a low memory state. For example, memory usage prediction module 128 may include memory usage prediction model 132 that includes one or more neural networks trained to determine, based on the values a plurality of memory metrics inputted into memory usage prediction module 128, produce an output indicative of a safe amount of memory available for allocation by application 120. In some examples, memory usage prediction module 128 may also use machine learning to determine a prediction of whether application 120 is danger of being terminated by low memory termination module 130. For example, memory usage prediction module 128 may include memory usage prediction model 132 that includes one or more neural networks trained to determine, based on the values of one or more memory metrics inputted into memory usage prediction model 132, produce an output indicative of whether application 120 is in danger of being terminated.

The one or more neural networks of memory usage prediction module 128 may be trained using training data generated by performing stress tests by executing a plurality of application over a variety of computing devices. The different computing devices may include computing devices made by different manufacturers, different models of computing devices made by the same manufacturer, computing devices including different processors, computing devices having different amounts of memory (e.g., RAM) that can be allocated by processes executing at the computing devices, computing devices running different versions of operating systems, computing devices that execute different combinations of applications and/or processes, computing devices having different versions of firmware, and the like.

Stress tests may be performed on each of the computing devices by executing a plurality of applications and/or processes on each of the computing devices that may continue to allocate memory until the computing device terminates an application and/or process, such as due to the computing device being out of memory or being low on memory. As the applications and/or processes executes on the computing devices during the stress tests, the applications and/or processes may allocate different types of memory (e.g., native heap memory and/or graphics memory), values of memory metrics of the computing devices as the applications and/or processes execute may be monitored and collected. Similarly, when an application and/or process is terminated by, for example, a low memory termination module at a computing device, the values of memory metrics when the application and/or processes terminated may also be collected. Such stress tests may be run thousands of times (e.g., over 2000 times).

The training data may therefore include values of memory metrics collected by the computing devices while applications and/or processes execute during periods of time where no application or process was terminated due to a low memory or an out of memory condition. The training data may also include values of memory metrics collected by the computing devices while applications and/or processes execute at points in time when an application and/or process was terminated due to a low memory or an out of memory condition. Examples of the memory metrics may include any combination of the memory metrics listed above. In addition, the training data may also include other memory metrics, such as information associated with canary applications that execute at the computing device. Similarly, the inputs into memory usage prediction model 132 may be values of the memory metrics listed above, as well as any other suitable values, such as information associated with canary application 124 that executes at one or more processors 102.

In some examples, memory usage prediction module 128 may predict whether application 120 is in danger of being terminated by low memory termination module 130 by monitoring canary application 124 that is executing at one or more processors 102 to determine whether canary application 124 has been terminated by low memory termination module 130. Memory usage prediction module 128 may, in response to determining that canary application 124 has been terminated by low memory termination module 130, make a prediction that application 120 is in danger of being terminated by low memory termination module 130, and may, based on making the prediction that application 120 is in danger of being terminated by low memory termination module 130, send a warning to application 120 that indicates application 120 is in danger of being terminated by low memory termination module 130.

In some examples, as memory usage prediction module 128 executes, memory usage prediction module 128 may provide an API that includes one or more functions that application 120 may call to receive, from memory usage prediction module 128, information associated with a predicted safe amount of memory available for allocation by application 120 as determined by memory usage prediction module 128. When application 120 calls the one or more functions of the API to receive the information associated with a predicted safe amount of memory available for allocation by application 120, memory usage prediction module 128 may determine, using the real-time values of the plurality of the memory metrics, a predicted safe amount of memory available for allocation by application 120, and may send information indicative of the predicted safe amount of memory available for allocation by application 120 to application 120.

In some examples, the API provided by memory usage prediction module 128 may include one or more callback functions that may provide, to application 120, information indicative of the predicted safe amount of memory available for allocation by application 120. For example, the API may include a callback function that may warns application 120 when memory usage prediction module 128 predicts that application 120 is in danger of being terminated by low memory termination module 130. Memory usage prediction module 128 may periodically determine, based on the techniques described in this disclosure, whether application 120 is in danger of being terminated by low memory termination module 130. Memory usage prediction module 128 may therefore, in response to determining that application 120 is in danger of being terminated by low memory termination module 130, send a warning to application 120 that indicates application 120 is in danger of being terminated by low memory termination module 130.

Similarly, the API provided by memory usage prediction module 128 may include one or more callback functions that sends application 120 an indication of whether significant allocation of memory by application 120 should stop and/or whether memory allocated by application 120 should be freed. Memory usage prediction module 128 may periodically determine, based on the techniques described in this disclosure, whether significant allocation of memory by application 120 should stop. Memory usage prediction module 128 may therefore, in response to determining that significant allocation of memory by application 120 should stop, send, to application 120, an indication that significant allocation of memory by application 120 should stop.

Memory usage prediction module 128 may periodically determine, based on the techniques described in this disclosure, whether memory allocated by application 120 should be freed. Memory usage prediction module 128 may therefore, in response to determining that memory allocated by application 120 should be freed, send, to application 120, an indication that memory allocated by application 120 should be freed. Memory usage prediction module 128 may also be able to determine that significant allocation of memory by application 120 should stop and that memory allocated by application 120 should be freed before operating system 126 signals to application 120 that application 120 is about to run out of memory.

Application 120 may, at startup, communicate with memory usage prediction module 128 to receive information indicative of a predicted safe amount of memory available for allocation by application 120 from memory usage prediction module 128. For example, application 120 may call one or more functions of the API provided by memory usage prediction module 128, and memory usage prediction module 128 may determine, using the real-time values of the plurality of the memory metrics, a predicted safe amount of memory available for allocation by application 120, and may send information indicative of the predicted safe amount of memory available for allocation by application 120 to application 120.

Application 120 may, in response to receiving the information indicative of a predicted safe amount of memory available for allocation by application 120, adjust one or more characteristics of application 120 based on the predicted safe amount of memory available for allocation by application 120. For example, application 120 may be able to estimate the memory footprint of assets, graphics qualities, screen resolutions, texture resolutions, and the like, and may select assets such as audio, particle effects, or shadows to be loaded into memory, adjust graphics quality of application 120, adjust the screen resolution used by application 120, and/or adjust the texture resolution of the graphics outputted by application 120, and the like based on the predicted safe amount of memory available for allocation by application 120.

As application 120 continues to execute at one or more processors 102, application 120 may continue to periodically communicate with memory usage prediction module 128 to receive up-to-date information indicative of a predicted safe amount of memory available for allocation by application 120 from memory usage prediction module 128, and may adjust one or more characteristics of application 120 based on the predicted safe amount of memory available for allocation by application 120. In the example where application 120 is a gaming application, application 120 may, prior to rendering each frame of graphics when application 120 is in a gaming state, call one or more functions of the API of memory usage prediction module 128 to receive, from memory usage prediction module 128, information indicative of the predicted safe amount of memory available for allocation by application 120.

Application 120 may therefore adjust the quality of graphics outputted by application 120 based on the predicted safe amount of memory available for allocation by application 120, such as to increase the amount of memory of RAM 112 allocated by application 120 or to decrease the amount of memory of RAM 112 allocated by application 120. For example, if application 120 determines that the safe amount of memory available for allocation by application 120 as predicted by memory usage prediction module 128 is sufficient for application 120 to increase the quality of graphics outputted by application 120, application 120 may select higher-quality assets to be loaded into memory, increase the graphics quality of application 120, increase the screen resolution used by application 120, increase the texture resolution of the graphics outputted by application 120, and the like. In another example, if application 120 determines that the safe amount of memory available for allocation by application 120 as predicted by memory usage prediction module 128 is not sufficient for application 120 to maintain the current the quality of graphics outputted by application 120, such as by determining that the safe amount of memory available for allocation by application 120 as predicted by memory usage prediction module 128 is less than a specified threshold (e.g., less than a certain amount of memory), application 120 may decrease the quality of graphics outputted by application 120, such as by selecting lower-quality assets to be loaded into memory, decreasing the graphics quality of application 120, decreasing the screen resolution used by application 120, decreasing the texture resolution of the graphics outputted by application 120, and the like In some examples, application 120 may adjust the amount of memory adjusted by application 120 by adjusting the number of concurrent threads used by application 120, such as the number of concurrent threads used to decompress data. For example, application 120 may decrease the number of concurrent threads used by application 120, such as by using a single thread, to decrease the amount of memory allocated by application 120, or may increase the number of concurrent threads used by application 120 to increase the amount of memory allocated by application 120.

In some examples, as application 120 executes, memory usage prediction module 128 may determine, based on a plurality of memory metrics, that application 120 is in danger of being terminated, such as by predicting, based on the plurality of memory metrics, that computing device 100 is currently in a low memory condition. Memory usage prediction module 128 may, in response to determining that application 120 is in danger of being terminated, send, to application 120, such as via one or more callback functions, an indication that application 120 is in danger of being terminated. Application 120 may, in response to receiving the indication that application 120 is in danger of being terminated, take one or more actions to decrease use of memory, such as by decreasing the quality of graphics outputted by application 120, as described above, reducing the number of concurrent threads used by application 120, and the like.

In some examples, as application 120 executes, memory usage prediction module 128 may determine, based on a plurality of memory metrics, that significant allocation of memory by application 120 should stop. Memory usage prediction module 128 may, in response to determining that significant allocation of memory by application 120 should stop, send, to application 120, such as via one or more callback functions, an indication to stop significant allocation of memory by application 120. Application 120 may, in response to receiving the indication to stop significant allocation of memory by application 120, refrain from significantly increasing application 120's use of memory, such as by refraining from significantly increasing the quality of graphics outputted by application 120, as described above, and the like.

In some examples, as application 120 executes, memory usage prediction module 128 may determine, based on a plurality of memory metrics, that memory allocated by application 120 should be freed. Memory usage prediction module 128 may, in response to determining that memory allocated by application 120 should be freed, send, to application 120, such as via one or more callback functions, an indication to free memory allocated by application 120. Application 120 may, in response to receiving the indication to free memory allocated by application 120, take one or more actions to decrease use of memory, such as by decreasing the quality of graphics outputted by application 120, as described above, reducing the number of concurrent threads used by application 120, and the like.

FIGS. 2A through 2E are conceptual diagrams illustrating aspects of an example machine-learned model according to example implementations of the present disclosure. FIGS. 2A through 2E are described below in the context of memory usage prediction model 132 of FIG. 1. For example, in some instances, machine-learned model 200, as referenced below, may be an example of memory usage prediction model 132.

Figure 2A:
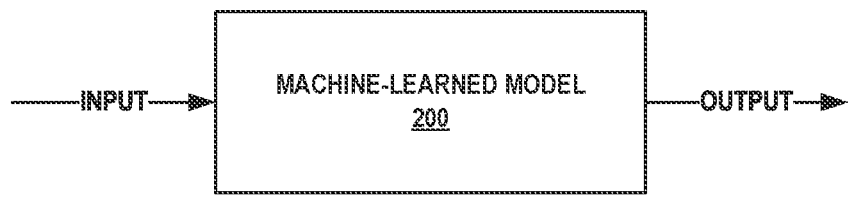
FIGS. 2A through 2E are conceptual diagrams illustrating aspects of an example machine-learned model according to example implementations of the present disclosure.

FIG. 2A depicts a conceptual diagram of an example machine-learned model according to example implementations of the present disclosure. As illustrated in FIG. 2A, in some implementations, machine-learned model 200 is trained to receive input data of one or more types and, in response, provide output data of one or more types. Thus, FIG. 2A illustrates machine-learned model 200 performing inference.

The input data may include one or more features that are associated with an instance or an example, such as values of one or more memory metrics described above. In some implementations, the one or more features associated with the instance or example can be organized into a feature vector. In some implementations, the output data can include one or more predictions. Predictions can also be referred to as inferences. Thus, given features associated with a particular instance, machine-learned model 200 can output a prediction for such instance based on the features. For example, machine-learned model 200 may output a prediction of whether an application is in danger of being terminated, such as by low memory termination module 130 of FIG. 1, or machine-learned model 200 may output a predicted safe amount of memory available for allocation by an application.

Machine-learned model 200 can be or include one or more of various different types of machine-learned models. In particular, in some implementations, machine-learned model 200 can perform classification, regression, clustering, anomaly detection, recommendation generation, and/or other tasks.

In some implementations, machine-learned model 200 can perform various types of classification based on the input data. For example, machine-learned model 200 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 200 may perform discrete categorical classification in which the input data is simply classified into one or more classes or categories.

In some implementations, machine-learned model 200 can perform classification in which machine-learned model 200 provides, for each of one or more classes, a numerical value descriptive of a degree to which it is believed that the input data should be classified into the corresponding class. In some instances, the numerical values provided by machine-learned model 200 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine-learned model 200 may output a probabilistic classification. For example, machine-learned model 200 may predict, given a sample input, a probability distribution over a set of classes. Thus, rather than outputting only the most likely class to which the sample input should belong, machine-learned model 200 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine-learned model 200 performs classification, machine-learned model 200 may be trained using supervised learning techniques. For example, machine-learned model 200 may be trained on a training dataset that includes training examples labeled as belonging (or not belonging) to one or more classes. Further details regarding supervised training techniques are provided below in the descriptions of FIGS. 2B through 2E.

In some implementations, machine-learned model 200 can perform regression to provide output data in the form of a continuous numeric value. The continuous numeric value can correspond to any number of different metrics or numeric representations, including, for example, currency values, scores, or other numeric representations. As examples, machine-learned model 200 can perform linear regression, polynomial regression, or nonlinear regression. As examples, machine-learned model 200 can perform simple regression or multiple regression. As described above, in some implementations, a Softmax function or other function or layer can be used to squash a set of real values respectively associated with a plurality of possible classes to a set of real values in the range (0, 1) that sum to one.

Machine-learned model 200 may perform various types of clustering. For example, machine-learned model 200 can identify one or more previously-defined clusters to which the input data most likely corresponds. Machine-learned model 200 may identify one or more clusters within the input data. That is, in instances in which the input data includes multiple objects, documents, or other entities, machine-learned model 200 can sort the multiple entities included in the input data into a number of clusters. In some implementations in which machine-learned model 200 performs clustering, machine-learned model 200 can be trained using unsupervised learning techniques.

Machine-learned model 200 may perform anomaly detection or outlier detection. For example, machine-learned model 200 can identify input data that does not conform to an expected pattern or other characteristic (e.g., as previously observed from previous input data). As examples, the anomaly detection can be used for fraud detection or system failure detection.

In some implementations, machine-learned model 200 can provide output data in the form of one or more recommendations. For example, machine-learned model 200 can be included in a recommendation system or engine. As an example, given input data that describes previous outcomes for certain entities (e.g., a score, ranking, or rating indicative of an amount of success or enjoyment), machine-learned model 200 can output a suggestion or recommendation of one or more additional entities that, based on the previous outcomes, are expected to have a desired outcome (e.g., elicit a score, ranking, or rating indicative of success or enjoyment). As one example, given input data descriptive of a context of a computing device, such as computing device 100 of FIG. 1, a recommendation system can output a suggestion or recommendation of an application that the user might enjoy or wish to download to computing device 100.

Machine-learned model 200 may, in some cases, act as an agent within an environment. For example, machine-learned model 200 can be trained using reinforcement learning, which will be discussed in further detail below.

In some implementations, machine-learned model 200 can be a parametric model while, in other implementations, machine-learned model 200 can be a non-parametric model. In some implementations, machine-learned model 200 can be a linear model while, in other implementations, machine-learned model 200 can be a non-linear model.

As described above, machine-learned model 200 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 200 can be or include one or more classifier models such as, for example, linear classification models; quadratic classification models; etc. Machine-learned model 200 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 200 can be or include one or more decision tree-based models such as, for example, classification and/or regression trees; iterative dichotomiser 2 decision trees; C4.5 decision trees; chi-squared automatic interaction detection decision trees; decision stumps; conditional decision trees; etc.

Machine-learned model 200 may be or include one or more kernel machines. In some implementations, machine-learned model 200 can be or include one or more support vector machines. Machine-learned model 200 may be or include one or more instance-based learning models such as, for example, learning vector quantization models; self-organizing map models; locally weighted learning models; etc. In some implementations, machine-learned model 200 can be or include one or more nearest neighbor models such as, for example, k-nearest neighbor classifications models; k-nearest neighbors regression models; etc. Machine-learned model 200 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 200 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine-learned model 200 can be or include one or more feed forward neural networks. In feed forward networks, the connections between nodes do not form a cycle. For example, each connection can connect a node from an earlier layer to a node from a later layer.

In some instances, machine-learned model 200 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 200 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 200 can be or include one or more generative networks such as, for example, generative adversarial networks. Generative networks can be used to generate new data such as new images or other content.

Machine-learned model 200 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and the provide output data that reconstructs the input data from the encoding. Recently, the autoencoder concept has become more widely used for learning generative models of data. In some instances, the autoencoder can include additional losses beyond reconstructing the input data.

Machine-learned model 200 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings be useful inputs for downstream models. For example, embeddings can be useful to generalize input data (e.g., search queries) for a downstream model or processing system.

Machine-learned model 200 may include one or more clustering models such as, for example, k-means clustering models; k-medians clustering models; expectation maximization models; hierarchical clustering models; etc.

In some implementations, machine-learned model 200 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 200 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 200 can be an autoregressive model. In some instances, an autoregressive model can specify that the output data depends linearly on its own previous values and on a stochastic term. In some instances, an autoregressive model can take the form of a stochastic difference equation. One example of an autoregressive model is WaveNet, which is a generative model for raw audio.

In some implementations, machine-learned model 200 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example of an ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; Mada- Boost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 200 can be used to preprocess the input data for subsequent input into another model. For example, machine-learned model 200 can perform dimensionality reduction techniques and embeddings (e.g., matrix factorization, principal components analysis, singular value decomposition, word2vec/ GLOVE, and/or related approaches); clustering; and even classification and regression for downstream consumption. Many of these techniques have been discussed above and will be further discussed below.

As discussed above, machine-learned model 200 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 200 can receive and use the input data in its raw form. In some implementations, the raw input data can be preprocessed. Thus, in addition or alternatively to the raw input data, machine-learned model 200 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 200. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 200 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to predict of whether an application executing at a computing device is in danger of being terminated and/or a safe amount of memory available for allocation by an application executing at the computing device based on the real-time values of one or more memory metrics of the computing device. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 2B:
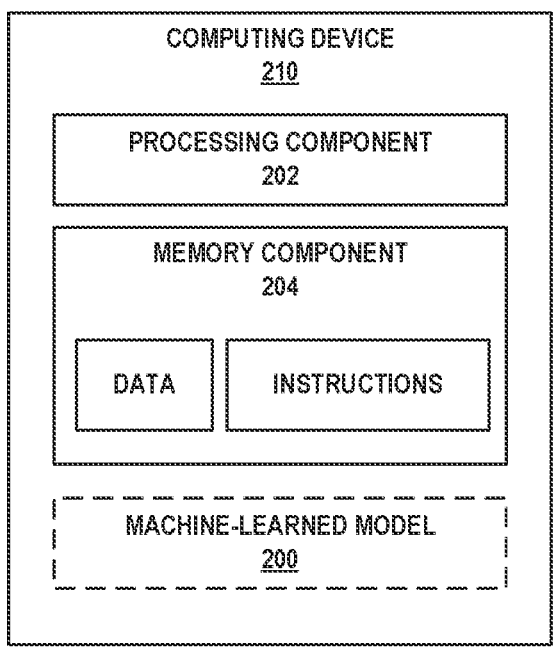

FIG. 2B illustrates a conceptual diagram of computing device 210, which is an example of computing device 100 of FIG. 1. Computing device 210 includes processing component 202, memory component 204 and machine-learned model 200. Computing device 210 may store and implement machine-learned model 200 locally (i.e., on-device). Thus, in some implementations, machine-learned model 200 can be stored at and/or implemented locally by an embedded device or a user computing device such as a mobile device. Output data obtained through local implementation of machine-learned model 200 at the embedded device or the user computing device can be used to improve performance of the embedded device or the user computing device (e.g., an application implemented by the embedded device or the user computing device).

Figure 2C:
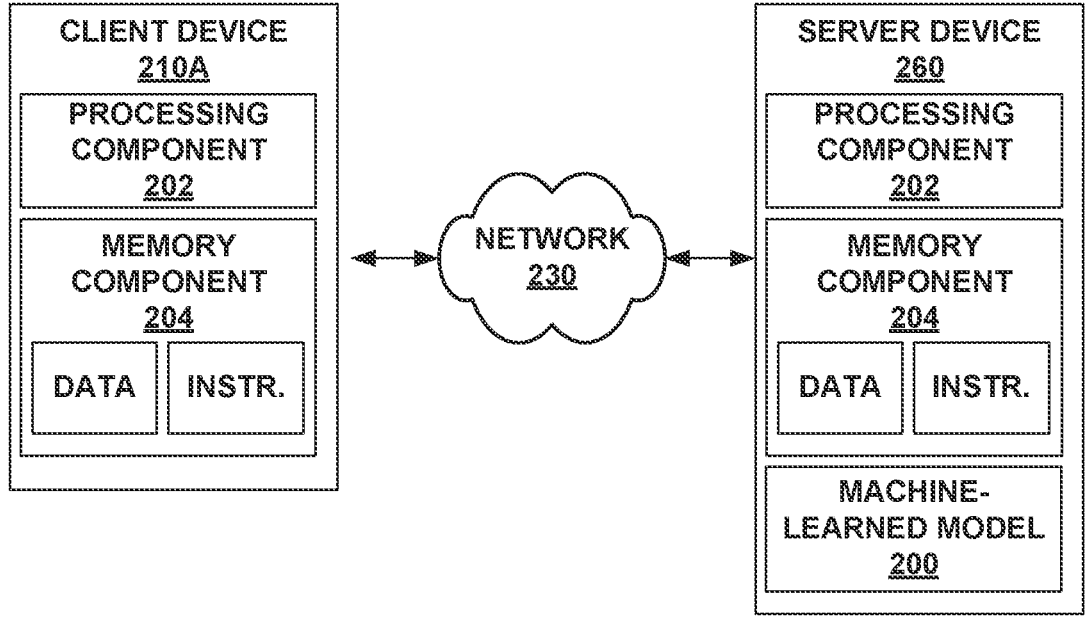

FIG. 2C illustrates a conceptual diagram of an example client computing device that can communicate over a network with an example server computing system that includes a machine-learned model. FIG. 2C includes client device 210A communicating with server device 260 over network 230. Client device 210A is an example of computing device 100 of FIG. 1 and server device 260 is an example of a computing system that trains memory usage prediction model 132 of FIG. 1 and transmits the trained memory usage prediction model 132 to computing device 100. Server device 260 stores and implements machine-learned model 200, which may be an example of memory usage prediction model 132 of FIG. 1. In some instances, output data obtained through machine-learned model 200 at server device 260 can be used to improve other server tasks or can be used by other non-user devices to improve services performed by or for such other non-user devices. For example, the output data can improve other downstream processes performed by server device 260 for a computing device of a user or embedded computing device. In other instances, output data obtained through implementation of machine-learned model 200 at server device 260 can be sent to and used by a user computing device, an embedded computing device, or some other client device, such as client device 210A. For example, server device 260 can be said to perform machine learning as a service.

In yet other implementations, different respective portions of machine-learned model 200 can be stored at and/or implemented by some combination of a user computing device; an embedded computing device; a server computing device; etc. In other words, portions of machine-learned model 200 may be distributed in whole or in part amongst client device 210A and server device 260.

Devices 210A and 260 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 210A and 260 may be distributed at different physical locations and connected via one or more networks, including network 230. If configured as distributed computing devices, Devices 210A and 260 may operate according to sequential computing architectures, parallel computing architectures, or combinations thereof. In one example, distributed computing devices can be controlled or guided through use of a parameter server.

In some implementations, multiple instances of machine-learned model 200 can be parallelized to provide increased processing throughput. For example, the multiple instances of machine-learned model 200 can be parallelized on a single processing device or computing device or parallelized across multiple processing devices or computing devices.

Each computing device that implements machine-learned model 200 or other aspects of the present disclosure can include a number of hardware components that enable performance of the techniques described herein. For example, each computing device can include one or more memory devices that store some or all of machine-learned model 200. For example, machine-learned model 200 can be a structured numerical representation that is stored in memory. The one or more memory devices can also include instructions for implementing machine-learned model 200 or performing other operations. Example memory devices include RAM, ROM, EEPROM, EPROM, flash memory devices, magnetic disks, etc., and combinations thereof.

Each computing device can also include one or more processing devices that implement some or all of machine-learned model 200 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 2D:
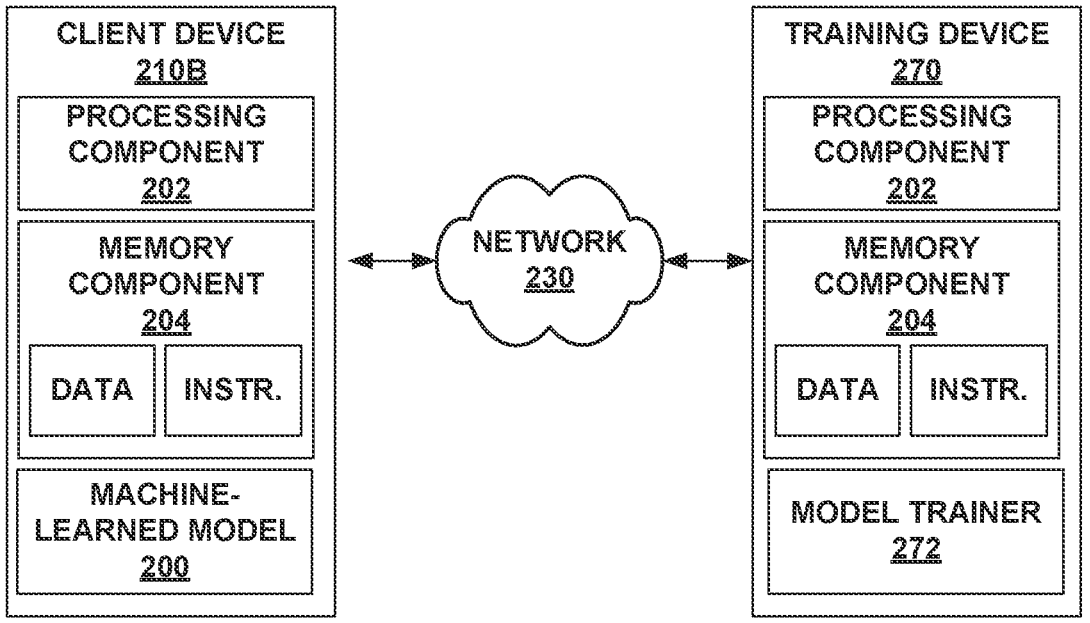

FIG. 2D illustrates a conceptual diagram of an example computing device in communication with an example training computing system that includes a model trainer. FIG. 2D includes client device 210B communicating with training device 270 over network 230. Client device 210B is an example of computing device 100 of FIG. 1. Machine-learned model 200 described herein can be trained at a training computing system, such as training device 270, and then provided for storage and/or implementation at one or more computing devices, such as client device 210B. For example, model trainer 272 executes locally at training device 270. However, in some examples, training device 270, including model trainer 272, can be included in or separate from client device 210B or any other computing device that implements machine-learned model 200.

In some implementations, machine-learned model 200 may be trained in an offline fashion or an online fashion. In offline training (also known as batch learning), machine-learned model 200 is trained on the entirety of a static set of training data. In online learning, machine-learned model 200 is continuously trained (or re-trained) as new training data becomes available (e.g., while the model is used to perform inference).

Model trainer 272 may perform centralized training of machine-learned model 200 (e.g., based on a centrally stored dataset). In other implementations, decentralized training techniques such as distributed training, federated learning, or the like can be used to train, update, or personalize machine-learned model 200.

Machine-learned model 200 described herein can be trained according to one or more of various different training types or techniques. For example, in some implementations, machine-learned model 200 can be trained by model trainer 272 using supervised learning, in which machine-learned model 200 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 2E:
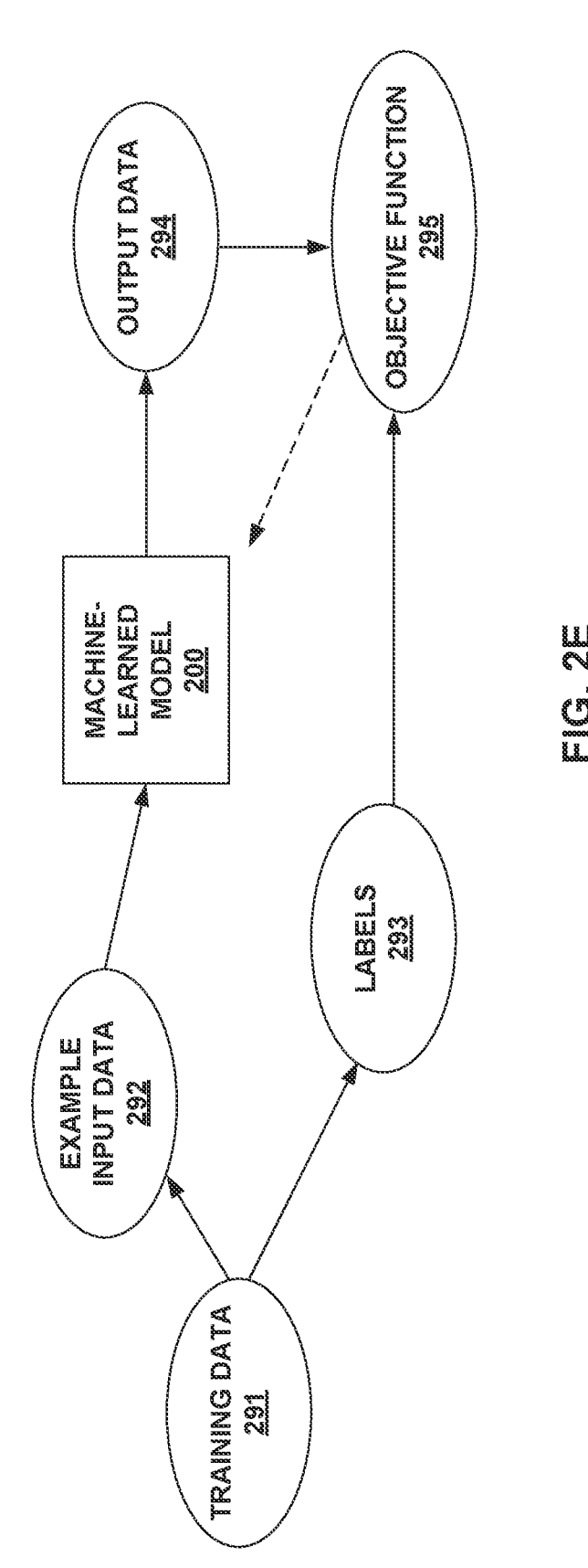

FIG. 2E illustrates a conceptual diagram of training process 290 which is an example training process in which machine-learned model 200 is trained on training data 291 that includes example input data 292 that has labels 293. Training process 290 is one example training process; other training processes may be used as well.

Training data 291 used by training process 290 can include, upon user permission for use of such data for training, historical values of memory metrics of computing devices over time. In some examples, training data 219 may include data generated by performing stress tests by executing a plurality of applications over a variety of computing devices. The different computing devices may include computing devices made by different manufacturers, different models of computing devices made by the same manufacturer, computing devices including different processors, computing devices having different amounts of memory (e.g., RAM) that can be allocated by processes executing at the computing devices, computing devices running different versions of operating systems, computing devices that execute different combinations of applications and/or processes, computing devices having different versions of firmware, and the like.

Stress tests may be performed on each of the computing devices by executing a plurality of applications and/or processes on each of the computing devices that may continue to allocate memory until the computing device terminates an application and/or process, such as due to the computing device being out of memory or being low on memory. As the applications and/or processes executes on the computing devices during the stress tests, the applications and/or processes may allocate different types of memory (e.g., native heap memory and/or graphics memory), values of memory metrics of the computing devices as the applications and/or processes execute may be monitored and collected. Similarly, when an application and/or process is terminated by, for example, a low memory termination module at a computing device, the values of memory metrics when the application and/or processes terminated may also be collected. Such stress tests may be run thousands of times (e.g., over 2000 times).

The training data may therefore include values of memory metrics collected by the computing devices while applications and/or processes execute during periods of time where no application or process was terminated due to a low memory or an out of memory condition. The training data may also include values of memory metrics collected by the computing devices while applications and/or processes execute at points in time when an application and/or process was terminated due to a low memory or an out of memory condition. Examples of the memory metrics may include any combination of the memory metrics listed above. In some implementations, training data 291 can include examples of input data 292 that have been assigned labels 293 that correspond to output data 294.

In some implementations, machine-learned model 200 can be trained by optimizing an objective function, such as objective function 295. For example, in some implementations, objective function 295 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 295 may be or include a cost function that describes a cost of a certain outcome or output data. Other examples of objective function 295 can include margin-based techniques such as, for example, triplet loss or maximum-margin training.

One or more of various optimization techniques can be performed to optimize objective function 295. For example, the optimization technique(s) can minimize or maximize objective function 295. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 200 (e.g., when machine-learned model is a multi-layer model such as an artificial neural network). For example, an iterative cycle of propagation and model parameter (e.g., weights) update can be performed to train machine-learned model 200. Example backpropagation techniques include truncated backpropagation through time, Levenberg- Marquardt backpropagation, etc.

In some implementations, machine-learned model 200 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 200 can be trained using semi-supervised techniques which combine aspects of supervised learning and unsupervised learning. Machine-learned model 200 can be trained or otherwise generated through evolutionary techniques or genetic algorithms. In some implementations, machine-learned model 200 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor suboptimal actions explicitly corrected.

In some implementations, one or more generalization techniques can be performed during training to improve the generalization of machine-learned model 200. Generalization techniques can help reduce overfitting of machine-learned model 200 to the training data. Example generalization techniques include dropout techniques; weight decay techniques; batch normalization; early stopping; subset selection; stepwise selection; etc.

In some implementations, machine-learned model 200 described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 200 described herein.

In some implementations, machine-learned model 200 described herein can be included in different portions of computer-readable code on a computing device. In one example, machine-learned model 200 can be included in a particular application or program and used (e.g., exclusively) by such particular application or program. Thus, in one example, a computing device can include a number of applications and one or more of such applications can contain its own respective machine learning library and machine-learned model(s).

In another example, machine-learned model 200 described herein can be included in an operating system of a computing device (e.g., in a central intelligence layer of an operating system) and can be called or otherwise used by one or more applications that interact with the operating system. In some implementations, each application can communicate with the central intelligence layer (and model(s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 3 is a flow diagram illustrating example operations of a process 300 that is performed by a mobile computing device, such as computing device 100 (FIG. 1), in accordance with one or more aspects of the present disclosure. For purposes of illustration only, the operations of FIG. 3 are described with reference to computing device 100 shown in FIG. 1.

As shown in FIG. 3, process 300 includes determining, by an application 120 from a plurality of applications executing at one or more processors 102 of a computing device 100, a plurality of memory metrics of the computing device 100 (302). Process 300 further includes determining, by the application 120 executing at the one or more processors 102, information indicative of a predicted safe amount of memory available for allocation by the application 120 based at least in part on the plurality of memory metrics (304). Process 300 further includes adjusting, by the application 120 executing at the one or more processors 102 and based at least in part on the information indicative of the prediction of the amount of memory available for allocation by the application 120, one or more characteristics of the application 120 executing at the one or more processors 102 adjust an amount of memory allocated by the application 120 (306).

This disclosure includes the following examples.

Example 1

A method includes determining, by an application from a plurality of applications executing at one or more processors of a computing device, a plurality of memory metrics of the computing device; determining, by the application executing at the one or more processors, information indicative of a predicted safe amount of memory available for allocation by the application based at least in part on the plurality of memory metrics; and adjusting, by the application executing at the one or more processors and based at least in part on the information indicative of the predicted safe amount of memory available for allocation by the application, one or more characteristics of the application executing at the one or more processors to adjust an amount of memory allocated by the application.

Example 2

The method of example 1, wherein the information indicative of the predicted safe amount of memory available for allocation by the application includes a predicted safe amount of memory that is available for allocation by the application without causing the computing device to enter a low memory state.

Example 3

The method of example 2, wherein adjusting the one or more characteristics of the application executing at the one or more processors to adjust the amount of memory allocated by the application further comprises: determining, by the application, that the predicted safe amount of memory that is available for allocation by the application is below a specified threshold; and in response to determining that the predicted safe amount of memory that is available for allocation by the application is below the specified threshold, adjusting, by the application, the one or more characteristics of the application executing at the one or more processors to decrease the amount of memory allocated by the application.

Example 4

The method of example 1, wherein the information indicative of the predicted safe amount of memory for allocation by the application includes an indication that the computing device is in a low memory state, and wherein the application is in danger of being terminated when the computing device is in the low memory state.

Example 5

The method of example 1, wherein determining the information indicative of the predicted safe amount of memory available for allocation by the application further comprises: determining, by a library executing at the one or more processors as a separate process from the application, the information indicative of the predicted safe amount of memory available for allocation by the application based at least in part on the plurality of memory metrics.

Example 6

The method of example 5, wherein determining the information indicative of the predicted safe amount of memory available for allocation by the application further comprises: inputting, by the library executing at the one or more processors, the plurality of memory metrics into a memory usage prediction model that comprises one or more neural networks to generate an output indicative of the information indicative of the predicted safe amount of memory available for allocation by the application.

Example 7

The method of example 6, wherein the memory usage prediction model is trained using training data generated from performing stress tests on a plurality of different computing devices and monitoring values of the plurality of memory metrics of the plurality of different computing devices at points in time when applications were terminated by the plurality of different computing devices.

Example 8

The method of example 5, wherein determining the information indicative of the predicted safe amount of memory available for allocation by the application further comprises: determining, by the library executing at the one or more processors, upper thresholds for the plurality of memory metrics; and comparing, by the library executing at the one or more processors, values of the plurality of memory metrics with the upper thresholds for each of the plurality of memory metrics to determine the information indicative of the predicted safe amount of memory available for allocation by the application.

Example 9

The method of example 8, wherein determining the upper thresholds for each of the plurality of memory metrics further comprises: determining, by the one or more processors, highest values reached by each of the plurality of memory metrics immediately prior to one or more applications executing at the one or more processors being terminated due to the computing device being in a low memory state; and determining, by the one or more processors, the upper thresholds for the plurality of memory metrics based at least in part on the highest values reached by each of the plurality of memory metrics.

Example 10

The method of example 9, wherein determining the upper thresholds for the plurality of memory metrics based at least in part on the highest values reached by each of the plurality of memory metrics further comprises: inputting, by the one or more processors, the highest values reached by each of the plurality of memory metrics into one or more neural networks to determine the upper thresholds for the plurality of memory metrics.

Example 11

A computing device includes memory; and at least one processor communicably coupled to the memory and configured to: execute a plurality of applications; determine a plurality of memory metrics of the memory; determine information indicative of a predicted safe amount of memory available for allocation by an application from the plurality of applications based at least in part on the plurality of memory metrics; and adjust, based at least in part on the information indicative of the predicted safe amount of memory available for allocation by the application, one or more characteristics of the application executing at the at least one processor to adjust an amount of memory allocated by the application.

Example 12

The computing device of example 11, wherein the information indicative of the predicted safe amount of memory available for allocation by the application includes a predicted safe amount of memory that is available for allocation by the application without causing the computing device to enter a low memory condition.

Example 13

The computing device of example 12, wherein to adjust the one or more characteristics of the application executing at the at least one processor to adjust the amount of memory allocated by the application, the at least one processor are further configured to: determine that the predicted safe amount of memory that is available for allocation by the application is below a specified threshold; and in response to determining that the predicted safe amount of memory that is available for allocation by the application is below the specified threshold, adjust the one or more characteristics of the application executing at the at least one processor to decrease the amount of memory allocated by the application.

Example 14

The computing device of example 11, wherein the information indicative of the predicted safe amount of memory for allocation by the application includes an indication that the computing device is in a low memory state.

Example 15

The computing device of example 11, wherein to determine the information indicative of the predicted safe amount of memory available for allocation by the application, the at least one processor are further configured to: execute a library as a separate process from the application to determine the information indicative of the predicted safe amount of memory available for allocation by the application based at least in part on the plurality of memory metrics.

Example 16

The computing device of example 15, wherein to execute the library to determine the information indicative of the predicted safe amount of memory available for allocation by the application, the at least one processor are further configured to: execute the library to input the plurality of memory metrics into a memory usage prediction model that comprises one or more neural networks to generate an output indicative of the information indicative of the predicted safe amount of memory available for allocation by the application.

Example 17

The computing device of example 16, wherein the memory usage prediction model is trained using training data generated from performing stress tests on a plurality of different computing devices and monitoring values of the plurality of memory metrics of the plurality of different computing devices at points in time when applications were terminated by the plurality of different computing devices.

Example 18

The computing device of example 15, wherein to execute the library to determine the information indicative of the predicted safe amount of memory available for allocation by the application, the at least one processor are further configured to: execute the library to determine upper thresholds for the plurality of memory metrics; and execute the library to compare values of the plurality of memory metrics with the upper thresholds for each of the plurality of memory metrics to determine the information indicative of the predicted safe amount of memory available for allocation by the application.

Example 19

The computing device of example 18, wherein to execute the library to determine the upper thresholds for each of the plurality of memory metrics, the at least one processor are further configured to: determine highest values reached by each of the plurality of memory metrics immediately prior to one or more applications executing at the at least one processor being terminated due to the computing device being in a low memory state; and determine the upper thresholds for the plurality of memory metrics based at least in part on the highest values reached by each of the plurality of memory metrics.

Example 20

A computer-readable storage medium having stored thereon instructions that, when executed, cause one or more processors of a computing device to: determine a plurality of memory metrics of memory of the computing device; determine information indicative of a predicted safe amount of memory available for allocation by an application based at least in part on the plurality of memory metrics; and adjust, based at least in part on the information indicative of the predicted safe amount of memory available for allocation by the application, one or more characteristics of the application executing at the one or more processors to adjust an amount of memory allocated by the application.

Example 21

A method includes determining, by an application from a plurality of applications executing at one or more processors of a computing device, one or more memory metrics of the computing device; determining, by the application executing at the one or more processors, information indicative of a prediction of a safe amount of memory available for allocation by the application based at least in part on the one or more memory metrics; and adjusting, by the application executing at the one or more processors and based at least in part on the information indicative of the predicted safe amount of memory available for allocation by the application, one or more characteristics of the application executing at the one or more processors.

Example 22

The method of example 21, wherein the information indicative of the safe amount of memory available for allocation by the application includes an amount of memory available for allocation by the application without causing the computing device to enter a low memory condition.

Example 23

The method of any of examples 21 and 22, wherein the information indicative of the predicted safe amount of memory for allocation by the application includes an indication that the computing device is in a low memory condition.

Example 24

The method of any of examples 21-23, wherein the information indicative of the prediction of the safe amount of memory for allocation by the application includes an indication that significant allocation of memory by the application should stop.

Example 25

The method of any of examples 21-24, wherein the information indicative of the prediction of the safe amount of memory for allocation by the application includes an indication that memory allocated by the application should be freed.

Example 26

The method of any of examples 21-25, wherein the one or more memory metrics comprise at least one of one or more kernel-level memory statistics or one or more operating system-level memory statistics.

Example 27

The method of example 26, wherein determining the one or more memory metrics further comprises: invoking, by the application executing at the one or more processors, one or more methods of an operating system-level application programming interface (API) to receive the one or more operating system-level memory metrics.

Example 28

The method of any of examples 26 and 27, wherein the one or more metrics include a value indicative of a priority level associated with the application.

Example 29

The method of example 5, wherein the one or more memory metrics comprise information associated with whether a canary application executing at the one or more processors has been terminated.

Example 30

The method of any of examples 21-29, wherein determining the information indicative of the prediction of the safe amount of memory available for allocation by the application further comprises: determining, by a library included in the application, the library executing at the one or more processors as a separate process from the application, the information indicative of the prediction of the safe amount of memory available for allocation by the application based at least in part on the one or more memory metrics.

Example 31

The method of example 30, wherein determining the prediction of the safe amount of memory available for allocation by the application further comprises: inputting, by the library executing at the one or more processors, the one or more memory metrics into a memory usage prediction model that comprises one or more neural networks to generate an output indicative of the information indicative of the prediction of the safe amount of memory available for allocation by the application.

Example 32

The method of any of examples 21-31, wherein determining the one or more memory metrics further comprises: determining, by the application executing at the one or more processors, the one or more memory metrics of the computing device in real-time as the application executes at the one or more processors.

Example 33

The method of any of examples 21-32, wherein adjusting the one or more characteristics of the application executing at the one or more processors further comprises: adjusting, by the application executing at the one or more processors, a quality of graphics to be outputted by the application for display at a display device.

Example 34

A computing device includes memory; and at least one processor communicably coupled to the memory and configured to: execute a plurality of applications; determine, by an application from the plurality of applications, one or more memory metrics of the memory; determine, by the application, information indicative of a prediction of a safe amount of memory available for allocation by the application based at least in part on the one or more memory metrics; and adjust, by the application and based at least in part on the information indicative of the prediction of the safe amount of memory available for allocation by the application, one or more characteristics of the application executing at the one or more processors.

Example 35

The computing device of example 34, wherein the at least one processor is configured to perform any of the methods of examples 22-33.

Example 36

A computer-readable storage medium having stored thereon instructions that, when executed, cause one or more processors of a computing device to: determine, by an application from a plurality of applications executing at the one or more processors of the computing device, one or more memory metrics of the computing device; determine, by the application executing at the one or more processors, information indicative of a prediction of a safe amount of memory available for allocation by the application based at least in part on the one or more memory metrics; and adjust, by the application executing at the one or more processors and based at least in part on the information indicative of the prediction of the safe amount of memory available for allocation by the application, one or more characteristics of the application executing at the one or more processors.

Example 37

The computer-readable storage medium of example 16, wherein the instructions further cause the one or more processors to perform any of the methods of examples 22-33.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
determining, by an application from a plurality of applications executing at one or more processors of a computing device, current values of a plurality of memory metrics of the computing device, including calling one or more functions provided by an operating system of the computing device to receive the current values of the plurality of memory metrics, wherein the plurality of memory metrics include per-process memory usage metrics for the plurality of applications;
determining, by a library executing at the one or more processors as a separate process from the application and using one or more machine-learned models to predict a safe amount of memory available for allocation based at least in part on the current values of the plurality of memory metrics, information indicative of a predicted safe amount of memory available for allocation by the application without causing the computing device to enter a low memory state in which the application is in danger of being terminated by the operating system;
monitoring, by the computing device, a canary application executing at the one or more processors to determine whether the canary application has been terminated;

responsive to determining the canary application has been terminated, making, by the computing device, a prediction that the application is in danger of being terminated;

responsive to making the prediction that the application is in danger of being terminated, sending, by the computing device and to the application, a warning indicating that the application is in danger of being terminated; and adjusting, by the application executing at the one or more processors and based at least in part on the information indicative of the predicted safe amount of memory available for allocation by the application, one or more characteristics of the application executing at the one or more processors to adjust an amount of memory allocated by the application to be at or below the predicted safe amount of memory available for allocation by the application to prevent the computing device from entering the low memory state.

2. The method of claim 1, wherein the information indicative of the predicted safe amount of memory available for allocation by the application includes a predicted safe amount of memory that is available for allocation by the application without causing the computing device to enter a low memory state.

3. The method of claim 2, wherein adjusting the one or more characteristics of the application executing at the one or more processors to adjust the amount of memory allocated by the application further comprises:

determining, by the application, that the predicted safe amount of memory that is available for allocation by the application is below a specified threshold; and in response to determining that the predicted safe amount of memory that is available for allocation by the application is below the specified threshold, adjusting, by the application, the one or more characteristics of the application executing at the one or more processors to decrease the amount of memory allocated by the application.

4. The method of claim 1, wherein the information indicative of the predicted safe amount of memory for allocation by the application includes an indication that the computing device is in a low memory state, and wherein the application is in danger of being terminated when the computing device is in the low memory state.

5. The method of claim 1, wherein determining the information indicative of the predicted safe amount of memory available for allocation by the application further comprises:

inputting, by the library executing at the one or more processors, the current values of the plurality of memory metrics into a memory usage prediction model that comprises one or more neural networks to generate an output indicative of the information indicative of the predicted safe amount of memory available for allocation by the application.

6. The method of claim 5, wherein the memory usage prediction model is trained using training data generated from performing stress tests on a plurality of different computing devices and monitoring values of the plurality of memory metrics of the plurality of different computing devices at points in time when applications were terminated by the plurality of different computing devices.

7. The method of claim 1, wherein determining the information indicative of the predicted safe amount of memory available for allocation by the application further comprises:

42 determining, by the library executing at the one or more processors, thresholds for the plurality of memory metrics; and comparing, by the library executing at the one or more processors, the current values of the plurality of memory metrics with the thresholds for each of the plurality of memory metrics to determine the information indicative of the predicted safe amount of memory available for allocation by the application.

8. The method of claim 7, wherein determining the thresholds for each of the plurality of memory metrics further comprises:

determining, by the one or more processors, highest values reached by each of the plurality of memory metrics immediately prior to one or more applications executing at the one or more processors being terminated due to the computing device being in a low memory state; and determining, by the one or more processors, the thresholds for the plurality of memory metrics based at least in part on the highest values reached by each of the plurality of memory metrics.

9. The method of claim 8, wherein determining the thresholds for the plurality of memory metrics based at least in part on the highest values reached by each of the plurality of memory metrics further comprises:

inputting, by the one or more processors, the highest values reached by each of the plurality of memory metrics into one or more neural networks to determine the thresholds for the plurality of memory metrics.

10. A computing device, comprising:

memory; and at least one processor communicably coupled to the memory and configured to:

execute a plurality of applications;

determine current values of a plurality of memory metrics of the memory, including calling one or more functions provided by an operating system of the computing device to receive the current values of the plurality of memory metrics, wherein the plurality of memory metrics include per-process memory usage metrics for the plurality of applications;

determine, by a library executing at the one or more processors as a separate process from the application and using one or more machine-learned models to predict a safe amount of memory available for allocation based at least in part on the current values of the plurality of memory metrics, information indicative of a predicted safe amount of memory available for allocation by an application from the plurality of applications without causing the computing device to enter a low memory state in which the application is in danger of being terminated by the operating system;

monitor a canary application executing at the one or more processors to determine whether the canary application has been terminated;

responsive to determining the canary application has been terminated, make a prediction that the application is in danger of being terminated;

responsive to making the prediction that the application is in danger of being terminated, send, to the application, a warning indicating that the application is in danger of being terminated; and adjust, based at least in part on the information indicative of the predicted safe amount of memory available for allocation by the application, one or more characteristics of the application executing at the at least one processor to adjust an amount of memory allocated by the application to be at or below the predicted safe amount of memory available for allocation by the application to prevent the computing device from entering the low memory state.

11. The computing device of claim 10, wherein information indicative of the predicted safe amount of memory available for allocation by the application includes a predicted safe amount of memory that is available for allocation by the application without causing the computing device to enter a low memory state.

12. The computing device of claim 11, wherein to adjust the one or more characteristics of the application executing at the at least one processor to adjust the amount of memory allocated by the application, the at least one processor are further configured to:

determine that the predicted safe amount of memory that is available for allocation by the application is below a specified threshold; and in response to determining that the predicted safe amount of memory that is available for allocation by the application is below the specified threshold, adjust the one or more characteristics of the application executing at the at least one processor to decrease the amount of memory allocated by the application.

13. The computing device of claim 10, wherein information indicative of the predicted safe amount of memory for allocation by the application includes an indication that the computing device is in a low memory state.

14. The computing device of claim 10, wherein to execute the library to determine the information indicative of the predicted safe amount of memory available for allocation by the application, the at least one processor are further configured to:

execute the library to input the current values of the plurality of memory metrics into a memory usage prediction model that comprises one or more neural networks to generate an output indicative of the information indicative of the predicted safe amount of memory available for allocation by the application.

15. The computing device of claim 14, wherein the memory usage prediction model is trained using training data generated from performing stress tests on a plurality of different computing devices and monitoring values of the plurality of memory metrics of the plurality of different computing devices at points in time when applications were terminated by the plurality of different computing devices.

16. The computing device of claim 10, wherein to execute the library to determine the information indicative of the predicted safe amount of memory available for allocation by the application, the at least one processor are further configured to:

execute the library to determine thresholds for the plurality of memory metrics; and execute the library to compare the current values of the plurality of memory metrics with the thresholds for each of the plurality of memory metrics to determine the information indicative of the predicted safe amount of memory available for allocation by the application.

17. The computing device of claim 16, wherein to execute the library to determine the thresholds for each of the plurality of memory metrics, the at least one processor are further configured to:

determine highest values reached by each of the plurality of memory metrics immediately prior to one or more applications executing at the at least one processor being terminated due to the computing device being in a low memory state; and determine the thresholds for the plurality of memory metrics based at least in part on the highest values reached by each of the plurality of memory metrics.

18. A non-transitory computer-readable storage medium having stored thereon instructions that, when executed, cause one or more processors of a computing device to:

determine, by an application from a plurality of applications executing at the one or more processors, current values of a plurality of memory metrics of memory of the computing device, including calling one or more functions provided by an operating system of the computing device to receive the current values of the plurality of memory metrics, wherein the plurality of memory metrics include per-process memory usage metrics for the plurality of applications;

determine, by a library executing at the one or more processors as a separate process from the application and using one or more machine-learned models to predict a safe amount of memory available for allocation based at least in part on the current values of the plurality of memory metrics, information indicative of a predicted safe amount of memory available for allocation by an application without causing the computing device to enter a low memory state in which the application is in danger of being terminated by the operating system;

monitor a canary application executing at the one or more processors to determine whether the canary application has been terminated;

responsive to determining the canary application has been terminated, make a prediction that the application is in danger of being terminated;

responsive to making the prediction that the application is in danger of being terminated, send, to the application, a warning indicating that the application is in danger of being terminated; and adjust, based at least in part on the information indicative of the predicted safe amount of memory available for allocation by the application, one or more characteristics of the application executing at the one or more processors to adjust an amount of memory allocated by the application to be at or below the predicted safe amount of memory available for allocation by the application to prevent the computing device from entering the low memory state.

* * * * *